C. E. REINHARDT-RUTLAND.
FASTENER OR HOOK AND THE LIKE.
APPLICATION FILED AUG. 27, 1917.
1,291,143. Patented Jan. 14, 1919.
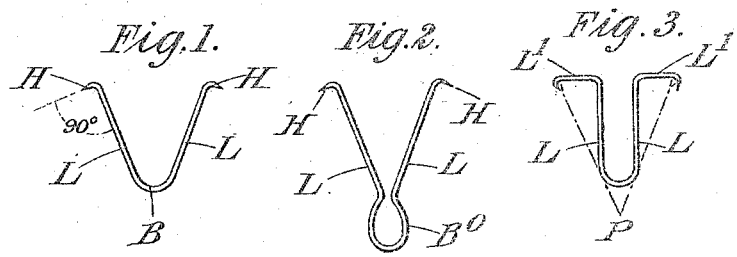
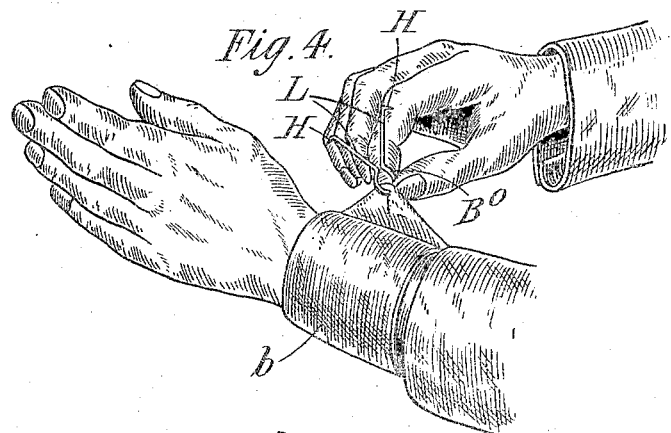
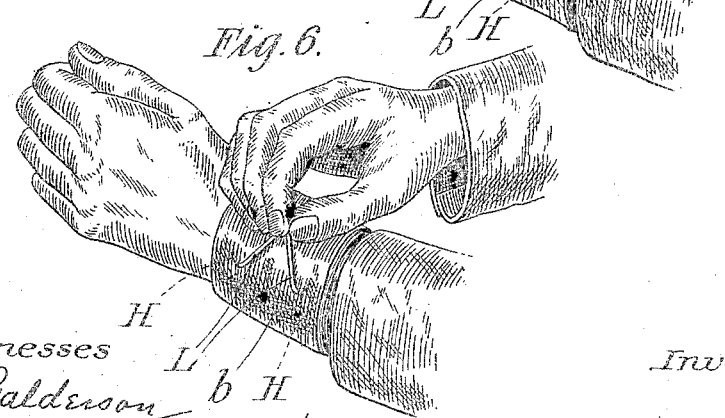
Witnesses
R. H. Balderson
J. B. Bliming
Inventor
Charles Emmanuel Reinhardt-Rutland
by his attorneys
Bakewell, Byrnes & Parmlee

UNITED STATES PATENT OFFICE.

CHARLES EMMANUEL REINHARDT-RUTLAND, OF LONDON, ENGLAND.

FASTENER OR HOOK AND THE LIKE.

1,291,143.   Specification of Letters Patent.   Patented Jan. 14, 1919.

Application filed August 27, 1917. Serial No. 188,383.

*To all whom it may concern:*

Be it known that I, CHARLES EMMANUEL REINHARDT-RUTLAND, a subject of the King of England, residing in London, England, have invented certain new and useful Improvements in Fasteners or Hooks and the like, of which the following is a specification.

This invention is of a one-piece fastener or hook for material such as surgical bandages and binders, or clothing-fabric. In the specification of prior British Letters Patent No. 4661 of 1915 granted to the present applicant a fastener or hook is described which consists of a length of wire bent into a U or V shape and provided with hooks at the extremities of the limbs in a plane normal to a plane which contains the limbs of the U or blunt V and contains a bend joining the limbs; in the specification of British Letters Patent No. 17073 of 1915 also granted to the present applicant, an alternative form of the U- or V-shaped fastener aforesaid is described in which there is a hump or other obstruction on, or constituting the junction-piece for, the lower ends of the limbs.

The present invention is of fasteners suited for use in the manner hereinafter described. The first of these fasteners consists of a single length of wire bent into U or V shape with a hook at the end of each limb as in the earlier specifications aforesaid, except that the present construction is characterized by limbs so made that they can be resiliently "sprung" toward one another and by the hooks being so directed that they point away from one another though not necessarily in the same line and lie in the general plane of the fastener or approximately so. The bridge or connection of one limb with the other at the apex of the U or V should be smooth and continuous and should lie in the plane which contains the limbs. A modification of this form may have the bridge or apex formed into a small, ellipsiform handle portion as hereinafter described, still contained, as in the former case, in the same plane as that which contains the limbs of the fastener.

A third form of fastener according to the present invention consists of a length of wire bent at its middle into U or V shape and characterized by an extension from each limb directed away from the center-line of the U or V and from the similar extension of the companion limb, and by a hook at the end of each extension.

In the accompanying drawings—

Figure 1 is an elevation of the first of the two before-mentioned fasteners;

Fig. 2 is an elevation of the modification thereof comprising the ellipsiform handle aforesaid;

Fig. 3 is a similar view of the third form of fastener aforesaid, and

Figs. 4, 5 and 6 are perspective views to a smaller scale than that of Figs. 1, 2 and 3 and illustrating the manner in which the fastener illustrated in Fig. 2 is applied to a wrist-bandage.

With reference first to Fig. 1, the wire is bent into a V-shape with a hook H at the end of each of the limbs L; it will be seen that the two hooks point away from one another and that in the plane in which the end of the limb and the tip of the hook upon it are contained, the angle between the tip of the hook and the end of the limb at which the hook is situated is about 90° as indicated; but of course this angle may be different if desired. B is the bridge or connection of each limb with the other at the apex, and it should be constituted by a smooth continuation of the limbs as shown; it lies in the plane which contains the limbs.

Fig. 2 shows an ellipsiform bridge B° between the limbs, to form a convenient handle. The whole structure, in Fig. 2, as in Fig. 1, lies in one plane.

With reference now to Fig. 3, each limb has upon it an extension $L^1$ directed away from the center-line of the V and from the similar extension of the companion limb; the hook in this modification is at the end of each extension. The tip of the hook can be at right angles to the extension as shown, or may be slightly inclined as to its tip, so that the tips converge, in the manner indicated by the chain-lines, toward a point P in the direction in which the apex of the fastener points. Preferably the whole of this structure is in one plane as shown, although the tips of the hooks might, if desired, be directed slightly out of the general plane of the fastener.

Fig. 3 shows a bridge or connection B which connects each limb with the other at the apex of the U.

It is desirable that this third structure should be more or less rigid, as distinguished from the resilience of the constructions first above described.

In Figs. 1, 2 and 3 the bridge or handle or connection B or B° of one limb with the other at the apex of the U or V and formed as a circular arc in Fig. 1 or Fig. 3, or as an elliptical arc in Fig. 2, merges smoothly into the limbs of the fastener by a smooth continuous transition as exemplified in the drawings, and is unobstructed, i. e. offers no obstruction to the sliding of the material of the bandage through which one limb of the fastener has been inserted, along the limb and along the bridge to the apex of the latter, as shown in Fig. 4.

As to the use of these devices, the instructions for the use of a fastener of the type exemplified in Fig. 2 are as follows— see Figs. 4, 5 and 6:—Pass either of the two pointed ends of the fastener through the free end of the bandage or binder $b$ and draw the latter to the requisite tightness, in the manner indicated in Fig. 4. Next, keeping the bandage as tight as may be desired, and holding the fastener with finger and thumb, insert (see Fig. 5) the tip of the left hand hook into the material and press the limbs of the fastener toward one another. Then release the pressure upon the limbs of the fastener and the resilience thereof will separate them slightly and will insure a firm engagement, as shown in Fig. 6, of both the hooks with the main portion of the bandage.

The manner of using the third form, i. e. that which is illustrated in Fig. 3, is similar to that which is above described with reference to the example illustrated in Fig. 2, except that the sides of the fastener need not be pressed toward one another, so that no further description appears to be necessary except that after the first of the tips has been inserted in the main portion of the bandage much in the manner hereinbefore described with reference to Fig. 5, the V portion of the fastener may be turned about it as a lever about a fulcrum to draw the free end of the bandage tighter before the second hook is engaged with the main portion of the bandage.

What I claim as my invention and desire to secure by Letters Patent is:—

1. A one-piece wire fastener having two legs connected to each other at one end, a laterally extending securing member at the other end of each leg, the legs, the connecting member between the legs, and the securing members all lying in the same plane, the arrangement being such that the thickness of the fastener at no point is greater than the diameter of the wire from which it is formed, substantially as described.

2. A one-piece spring wire fastener having two legs connected to each other at one end by a loop-shaped portion, said legs diverging from the loop-shaped portion, a laterally extending securing member at the other end of each leg, the securing members, legs and loop member connecting the leg all lying in the same plane, the arrangement being such that the thickness of the fastener at no point is greater than the diameter of the wire, substantially as described.

3. A one-piece wire fastener having two legs connected to each other at one end by a connecting member, a laterally extending member at the other end of each leg, a backwardly extending securing member at the end of each laterally extending member, the legs, the connecting member, the laterally extending members, and the securing members all lying in the same plane, the arrangement being such that the thickness of the fastener at no point is greater than the diameter of the wire from which it is formed, substantially as described.

In testimony whereof I have signed my name to this specification.

CHARLES EMMANUEL REINHARDT-RUTLAND.

Copies of this patent may be obtained for five cents each, by addressing the "Commissioner of Patents, Washington, D. C."